US011496199B2

(12) United States Patent
Zhang et al.

(10) Patent No.: US 11,496,199 B2
(45) Date of Patent: Nov. 8, 2022

(54) METHODS AND APPARATUS SUPPORTING BEAM FAILURE RECOVERY IN SYSTEM WITH MULTIPLE-BEAM OPERATION

(71) Applicant: MEDIATEK SINGAPORE PTE. LTD., Singapore (SG)

(72) Inventors: Yuanyuan Zhang, Beijing (CN); Chia-Hao Yu, Hsin-Chu (TW); Yu-Syuan Jheng, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/310,111

(22) PCT Filed: May 3, 2018

(86) PCT No.: PCT/CN2018/085463
§ 371 (c)(1),
(2) Date: Dec. 14, 2018

(87) PCT Pub. No.: WO2018/202081
PCT Pub. Date: Nov. 8, 2018

(65) Prior Publication Data
US 2020/0059285 A1 Feb. 20, 2020

(30) Foreign Application Priority Data
May 3, 2018 (WO) ................ PCT/CN2018/085463

(51) Int. Cl.
*H04B 7/06* (2006.01)
*H04W 24/10* (2009.01)
(Continued)

(52) U.S. Cl.
CPC .......... *H04B 7/0695* (2013.01); *H04W 24/10* (2013.01); *H04W 72/042* (2013.01);
(Continued)

(58) Field of Classification Search
None
See application file for complete search history.

(56) References Cited

U.S. PATENT DOCUMENTS 9,900,891 B1 * 2/2018 Islam ................... H04B 7/04
2013/0155847 A1 * 6/2013 Li ........................ H04W 76/10
370/225

(Continued)

FOREIGN PATENT DOCUMENTS

WO WO 2017/024516 A1 2/2017
WO WO-2018201380 A1 * 11/2018 ............... H04B 7/04

OTHER PUBLICATIONS

Combined Taiwanese Office Action and Search Report dated Jun. 17, 2019 in Patent Application No. 107115263 (with English translation of categories of cited documents), 11 pages.
(Continued)

*Primary Examiner* — Gregory B Sefcheck
*Assistant Examiner* — Suk Jin Kang
(74) *Attorney, Agent, or Firm* — Oblon, McClelland, Maier & Neustadt, L.L.P.

(57) ABSTRACT

Aspects of the disclosure provide a method of beam failure handling. The method can include performing beam quality measurement of one or more beams transmitted from a base station (BS) at a user equipment (UE) in a beamformed wireless communication system, determining a beam failure occurs based on the beam quality measurement, and performing a beam recovery process that includes at least one of a contention-free beam recovery process or a contention-based beam recovery process. The one or more beams are used for transmitting physical downlink control channels (PDCCHs).

14 Claims, 10 Drawing Sheets

(51) Int. Cl.
  *H04W 72/04* (2009.01)
  *H04W 74/02* (2009.01)
  *H04W 74/08* (2009.01)
(52) U.S. Cl.
  CPC ......... *H04W 72/046* (2013.01); *H04W 74/02* (2013.01); *H04W 74/0833* (2013.01)

(56) References Cited

U.S. PATENT DOCUMENTS

| | | | |
|---|---|---|---|
| 2014/0204000 A1 | 7/2014 | Sato | |
| 2016/0353510 A1 | 12/2016 | Zhang et al. | |
| 2018/0138962 A1* | 5/2018 | Islam | H04L 5/0032 |
| 2018/0234960 A1* | 8/2018 | Nagaraja | H04B 17/318 |
| 2018/0270894 A1* | 9/2018 | Park | H04W 36/0055 |
| 2018/0270895 A1* | 9/2018 | Park | H04W 76/38 |
| 2018/0278310 A1* | 9/2018 | Lee | H04B 7/0645 |
| 2018/0279193 A1* | 9/2018 | Park | H04W 76/27 |
| 2018/0279218 A1* | 9/2018 | Park | H04W 36/08 |
| 2018/0279284 A1* | 9/2018 | Wang | H04W 72/14 |
| 2018/0302889 A1* | 10/2018 | Guo | H04B 7/088 |
| 2019/0124640 A1* | 4/2019 | Nagaraja | H04W 72/046 |
| 2019/0132066 A1* | 5/2019 | Park | H04W 36/0079 |
| 2019/0132777 A1* | 5/2019 | Park | H04W 36/0079 |
| 2019/0132778 A1* | 5/2019 | Park | H04W 16/28 |
| 2019/0141592 A1* | 5/2019 | Park | H04W 24/10 |
| 2019/0182687 A1* | 6/2019 | Akoum | H04W 72/046 |
| 2019/0327634 A1* | 10/2019 | Lee | H04W 24/10 |
| 2019/0335421 A1* | 10/2019 | Park | H04W 8/24 |
| 2019/0349915 A1* | 11/2019 | Ahn | H04L 5/0048 |
| 2019/0349960 A1* | 11/2019 | Li | H04W 72/1242 |
| 2019/0356371 A1* | 11/2019 | Osawa | H04B 7/063 |
| 2019/0356438 A1* | 11/2019 | Lee | H04L 5/00 |
| 2019/0387441 A1* | 12/2019 | Koskela | H04W 36/30 |
| 2020/0036430 A1* | 1/2020 | Kim | H04L 25/0204 |
| 2020/0059398 A1* | 2/2020 | Pan | H04L 41/0654 |
| 2020/0068416 A1* | 2/2020 | Kang | H04L 5/0023 |
| 2020/0068457 A1* | 2/2020 | You | H04W 36/08 |
| 2020/0083946 A1* | 3/2020 | You | H04W 72/046 |
| 2020/0083947 A1* | 3/2020 | Islam | H04B 7/0695 |
| 2020/0084089 A1* | 3/2020 | Da Silva | H04W 36/0085 |
| 2020/0119839 A1* | 4/2020 | Jo | H04W 72/046 |
| 2020/0120593 A1* | 4/2020 | Park | H04W 36/0069 |
| 2020/0128417 A1* | 4/2020 | Yoon | H04W 72/042 |
| 2020/0154326 A1* | 5/2020 | Deenoo | H04W 24/08 |
| 2020/0280359 A1* | 9/2020 | Jung | H04B 7/0632 |
| 2020/0350974 A1* | 11/2020 | Kim | H04W 72/04 |
| 2020/0383120 A1* | 12/2020 | da Silva | H04W 72/005 |
| 2020/0389826 A1* | 12/2020 | Park | H04W 36/26 |
| 2021/0105171 A1* | 4/2021 | Chen | H04W 72/04 |

OTHER PUBLICATIONS

International Search Report and Written Opinion dated Jul. 2, 2018, in PCT/CN2018/085463, filed May 3, 2018.
Samsung, "Discussion on recovery from beam failure", R1-1705343, 3GPP TSG RAN WG1 Meeting #88bis, Apr. 3-7, 2017, 6 pages.
European Search Report dated Oct. 16, 2020 in European Application No. 18795238.7, 8 pgs.
Nokia, et al., Beam Recovery in NR, 3GPP TSG-RAN WG2, Meeting #97, Athens, Greece, Feb. 13-17, 2017, R2-1701681, R2-1700075, 5 pgs.
MediaTek Inc., RAN2 Impacts in HF-NR, 3GPP TSG-RAN WG2 #94, Nanjing, China, May 23-27, 2016, R-163879, 5 pgs.
Office Action dated Feb. 17, 2021 in corresponding Indian Patent Application No. 201927047866 (with English Translation), 4 pages.
Samsung, "Discussion on Recovery from Beam Failure", 3GPP TSG RAN WG1 Meeting #88bis, R1-1705343, Apr. 3-7, 2017, 6 pages.
Combined Chinese Office Action and Search Report dated Jun. 2, 2021 in Chinese Patent Application No. 201880001454.7, 8 pages.

\* cited by examiner

METHODS AND APPARATUS SUPPORTING BEAM FAILURE RECOVERY IN SYSTEM WITH MULTIPLE-BEAM OPERATION

CROSS REFERENCE TO RELATED APPLICATIONS

This present disclosure claims the benefit of International Application No. PCT/CN2017/083252, "Methods and Apparatus Supporting Beam Failure Recovery in System with Multiple-beam Operation" filed on May 5, 2017, which is incorporated herein by reference in its entirety.

FIELD OF INVENTION

The present disclosure relates generally to wireless communication, and, more particularly, to beam failure recovery techniques in wireless communication systems capable of beam-formed transmission.

BACKGROUND OF THE INVENTION

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th Generation (5G) wireless communication systems to increase system capacity. Beamforming schemes can be employed to focus transmitted and/or received signal in a desired direction to compensate for unfavorable path loss of high frequency signals. For example, a base station may employ multiple beams to cover a serving area in a 5G system. Accordingly, a user equipment (UE) within the serving area may communicate with the base station using a first set of serving beams while monitoring signal qualities of a second set of candidate beams. When signal qualities of the serving beams fall below a threshold, the UE may switch to qualified candidate beams.

SUMMARY OF THE INVENTION

Aspects of the disclosure provide a method of beam failure handling. The method can include performing beam quality measurement of one or more beams transmitted from a base station (BS) at a user equipment (UE) in a beam-formed wireless communication system, the one or more beams used for transmitting physical downlink control channels (PDCCHs), determining a beam failure occurs based on the beam quality measurement, and performing a beam recovery process that includes at least one of a contention-free beam recovery process or a contention-based beam recovery process.

In one embodiment, when a candidate beam having a quality above a threshold is available and dedicated physical random access channel (PRACH) preambles are configured for the UE, the contention-free beam recovery process with the dedicated PRACH preambles is performed before performing the contention-based beam recovery process. In one example, a dedicated PRACH preamble that is dedicated to the UE and corresponds to the candidate beam having the quality above the threshold is transmitted.

In one embodiment, when a candidate beam having a quality above a threshold is unavailable, or no dedicated physical PRACH preambles are configured for the UE, the contention-based beam recovery process is performed.

In one embodiment, the contention-free and contention-based processes are performed alternately. One of the contention-free and contention-based processes are performed one or more times before performing another one of the contention-free and contention-based processes one or more times.

In various examples, the performing the beam recovery process that includes at least one of the contention-free beam recovery process or the contention-based beam recovery process includes one of: performing the contention-free beam recovery process one or more times until a timer expires, performing the contention-free beam recovery process one or more times until a counter reaches a maximum counter value, performing the contention-free beam recovery process one or more times until a timer expires or a counter reaches a maximum counter value, performing the contention-based beam recovery process one or more times until a timer expires, performing the contention-based beam recovery process one or more times until a counter reaches a maximum counter value, or performing the contention-based beam recovery process one or more times until a timer expires or a counter reaches a maximum counter value, In various examples, the performing the beam recovery process that includes at least one of the contention-free beam recovery process or the contention-based beam recovery process includes one of: performing the beam recovery process that includes at least one of the contention-free beam recovery process or the contention-based beam recovery process until a timer expires, performing the beam recovery process that includes at least one of the contention-free beam recovery process or the contention-based beam recovery process until a counter reaches a maximum counter value, or performing the beam recovery process that includes at least one of the contention-free beam recovery process or the contention-based beam recovery process until a timer expires or a counter reaches a maximum counter value.

An embodiment of the method further includes measuring qualities of a set of candidate beams configured for beam failure recovery. An embodiment of the method further includes providing a beam recovery failure indication when the beam recovery process that includes at least one of the contention-free beam recovery process or the contention-based beam recovery process fails, and in response to the beam recovery failure indication, establishing a connection to a preconfigured macro cell.

An embodiment of the method further includes performing a macro-cell-assisted beam recovery process before or after performing the beam recovery process that includes at least one of a contention-free beam recovery process or a contention-based beam recovery process.

Embodiments of the method can further include providing a beam recovery success indication when the beam recovery process that includes at least one of the contention-free beam recovery process or the contention-based beam recovery process succeeds, and in response to the beam recovery success indication, terminating a radio link failure (RLF) recovery process. Embodiments of the method can further include providing a beam recovery failure indication when the beam recovery process that includes at least one of the contention-free beam recovery process or the contention-based beam recovery process fails, and in response to the beam recovery failure indication, forcing a RLF self-recovery timer to expire.

Aspects of the disclosure provide a user equipment (UE). The UE can include processing circuitry configured to perform beam quality measurement of one or more beams transmitted from a base station (BS) in a beamformed wireless communication system, the one or more beams used for transmitting physical downlink control channels (PDCCHs), determine a beam failure occurs based on the beam quality measurement, and perform a beam recovery process that includes at least one of a contention-free beam recovery process or a contention-based beam recovery process.

Aspects of the disclosure provide a non-transitory computer-readable medium storing program instructions that, when executed by a processor, cause the processor to perform the method of beam failure handling.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
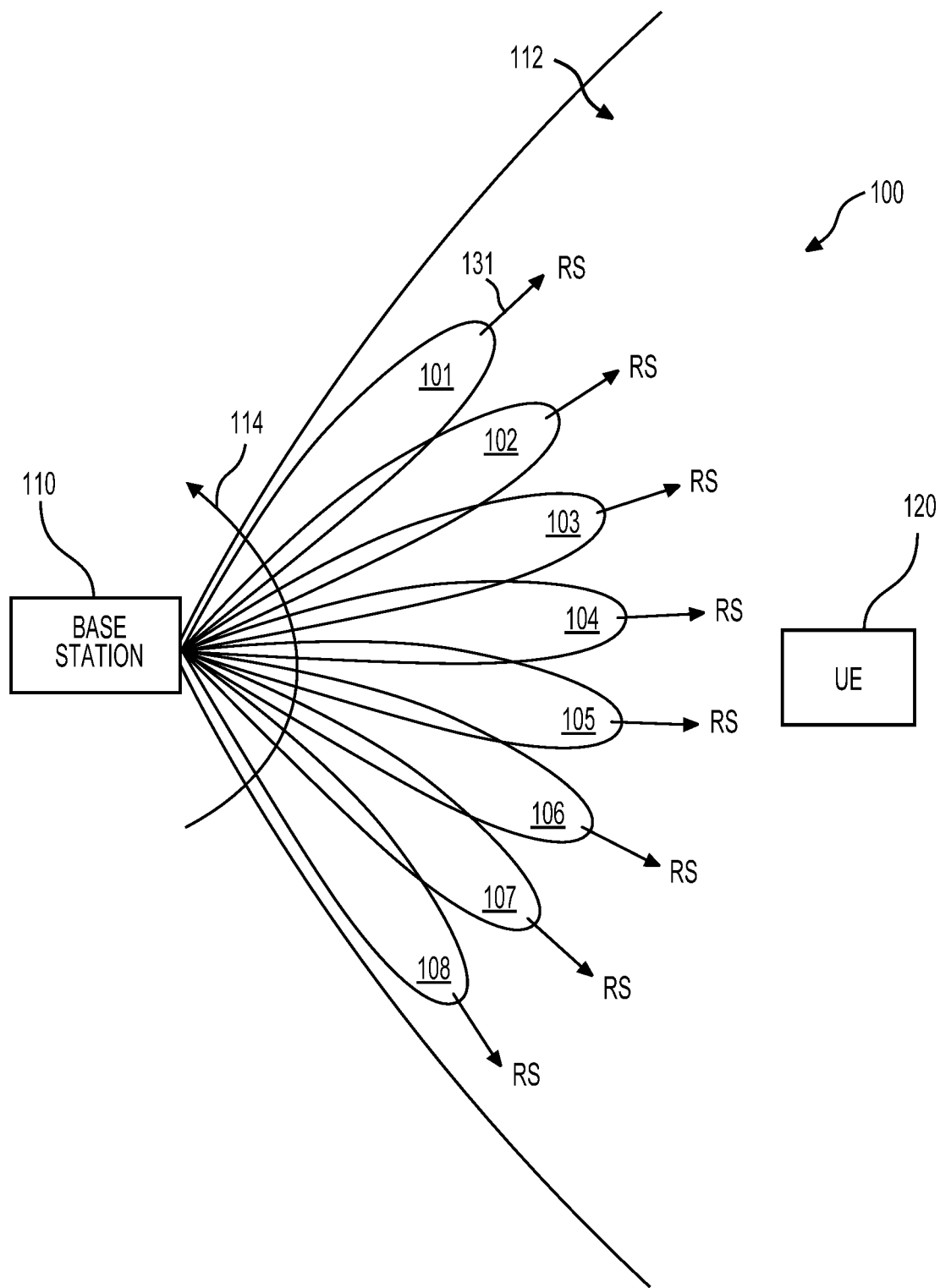
FIG. 1 shows a beam-based wireless communication system according to an embodiment of the disclosure.

FIG. 1 shows a beam-based wireless communication system 100 according to an embodiment of the disclosure. The system 100 can include a base station (BS) 110 and user equipment (UE) 120. The system 100 can employ the 5th generation (5G) technologies developed by the 3rd Generation Partnership Project (3GPP). For example, millimeter Wave (mm-Wave) frequency bands and beamforming technologies can be employed in the system 100. Accordingly, the BS 110 and the UE 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 110 can be a base station implementing a gNB node as specified in 5G new radio (NR) air interface standards developed by 3GPP. The BS 110 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception points (TRP).

In FIG. 1 example, the BS 110 can control a TRP to form Tx beams 101-108 to cover a cell 112. The beams 101-108 can be generated towards different directions. The beams 101-108 can be generated simultaneously or in different time intervals. In one example, the BS 110 is configured to perform a beam sweeping 114 to transmit L1/L2 control channel and/or data channel signals. During the beam sweeping 114, Tx beams 101-108 towards different directions can be successively formed in a time division multiplex (TDM) manner to cover the cell 112. During each time interval for transmission of one of the beams 101-108, a set of control channel data and/or data channel data can be transmitted. The beam sweeping 114 can be performed repeatedly with a certain periodicity. In alternative examples, the beams 101-108 may be generated in a way other than performing a beam sweeping. For example, multiple beams towards different directions may be generated at a same time. In other examples, different from FIG. 1 examples where the beams 101-108 are generated horizontally, the BS 110 can generate beams towards different horizontal or vertical directions. In an example, the maximum number of beams generated from a TRP can be 64.

Each beam 101-108 can be associated with various reference signals (RSs) 131, such as channel-state information reference signal (CSI-RS), demodulation reference signal (DMRS). Each beam 101-108 may also be used for transmission of synchronization signals (SSs), such as primary synchronization signal (PSS), and secondary synchronization signal (SSS). Each transmission interval containing PSS, SSS and PBCH corresponding to a Tx beam at the network side is called as an SS/PBCH block (SSB). For example, in the time domain, an SS/PBCH block consists of 4 OFDM symbols, numbered in increasing order from 0 to 3 within the SS/PBCH block, where PSS, SSS, and PBCH with associated DM-RS are mapped to different symbols. Those RSs and SSBs can serve for different purposes depending on related configurations and different scenarios. For example, some RSs and/or SSBs can be used as beam identification RSs for purpose of identifying a beam, or beam quality measurement RSs for monitoring beam qualities. Each beam 101-108, when transmitted at different occasions, may carry different signals, such as different L1/L2 data or control channels, or different RSs. Some of the beam transmission occasions may not carry PSS or SSS.

The UE 120 can be a mobile phone, a laptop computer, a vehicle carried mobile communication device, and the like. Similarly, the UE 120 can employ one or more antenna arrays to generate directional Tx or Rx beams for transmitting or receiving wireless signals. While only one UE 120 is shown in FIG. 1, a plurality of UEs can be served by the BS 110 simultaneously.

In operation, the UE 120 can monitor physical downlink control channels (PDCCHs) transmitted over a set of beams from the BS 110. The PDCCH can be used to carry downlink control information (DCI) such as downlink scheduling assignments and uplink grants. The DCI indicates allocated transmission resources, transport format, and the like for uplink or downlink transmission. Based on the DCI, the UE 120 can receive data carried in physical downlink shared channel (PDSCH) from the BS 110, and transmit data to the BS 110 in physical uplink shared channel (PUSCH).

The PDCCHs intended for the UE 120 can be transmitted during time intervals corresponding to transmissions of a subset of the beams 101-108. This subset of the beams 101-108 can be referred to as the control beams of the UE 120. While referred to as control beams, the control beams of the UE 120 can also be used to transmit other physical downlink channels (e.g., PDSCH) in addition to PDCCHs intended for the UE 120. For example, a control beam can be transmitted repeatedly during different intervals. Some of the transmissions of this control beam are used to transmit PDCCHs, and some of the transmissions of this control beam are used to transmit PDSCHs. Alternatively, one beam transmission may carry both PDCCHs and PDSCHs.

In one example, a beam training process may be performed to determine the control beam(s) serving the UE 120. During the beam training process, a quality of each beam pair link formed by one Tx beam of the base station 110 and a Rx beam of the UE 120 can be measured. Based on the quality measurements, a subset of beams with best qualities or qualities above a threshold can be determined for serving the UE 120. For example, the beams 102 and 103 may be selected for transmitting PDCCHs to the UE 120 as a result of the beam training process. In different examples, different number of control beams can be configured for the UE 120 to monitor PDCCHs, such as one, two, or more control beams.

A beam failure may occur when quality of beam pair link(s) corresponding to the control beam(s) of the UE 120 falls low enough according to a beam failure detection standard (or criterion) (e.g., comparison with a threshold, time-out of an associated timer). When the beam failure occurs, the UE 120 cannot correctly decode the PDCCHs transmitted over the current control beams. Accordingly, DCI from the BS 110 cannot reach the UE 120. Corresponding to the beam failure situation, aspects of the present disclosure provide several beam failure recovery mechanisms to locate one or more new control beams such that the UE 120 can recover from the beam failure.

In one example, the UE 120 may perform a contention-free beam recovery process to send a beam recovery request to the BS 110, which is associated to a candidate control beam. The association between the PRACH resource for the beam failure request transmission in UL and the candidate beam in DL is configured by the network. In one example, the UE 120 may perform a contention-based beam recovery process to determine a new control channel. In one example, a macro-cell-assisted beam recovery process is performed to allow a beam recovery request being transmitted with assistance of a macro cell.

Figure 2A:
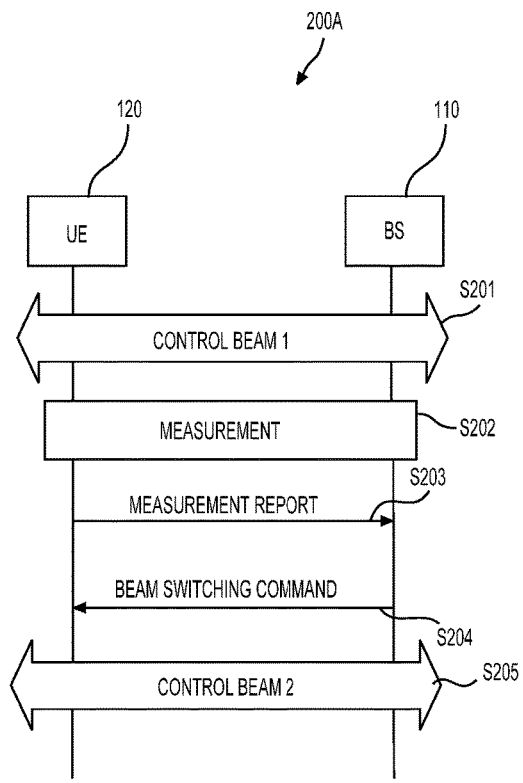
FIG. 2A-2B show a beam switching process according to an embodiment of the disclosure.

FIG. 2 shows a beam switching process 200A according to an embodiment of the disclosure. The process 200A is used as an example to explain situations in which beam failures may take place. During the process 200A, the UE 120 can switch from a first control beam (control beam 1) to a second control beam (control beam 2) when a quality of a beam pair link formed by the first control beam deteriorates.

Specifically, at S201, the UE 120 can communicate with the BS 110 through control beam 1. For example, downlink resource assignment and uplink resource grant can be received on PDCCHs transmitted over control beam 1. Data channel data can also be received over control beam 1.

At S202, beam pair link quality measurement can be performed. For example, the UE 120 can be configured to monitor a set of beam links corresponding to a set of Tx beams of the BS 110, and measure qualities of the set of beam pair links based on RSs (e.g., PSS, SSS, CRI-RS, etc.) received via respective beam links. The monitored beam pair links can include the beam pair link of control beam 1 currently being used.

At S203, the UE 120 can report the beam pair link quality measurement results to the BS 110. For example, the report can include beam link qualities corresponding to a set of beams having a quality above a threshold. The steps of S202 and S203 can be performed periodically according to a beam pair link quality measurement configuration.

At S204, the BS 110 can be triggered to transmit a beam switching command to the UE 120. For example, based on the received measurement report, the BS 110 can detect the quality of the beam pair link of control beam 1 is below a threshold, and another beam (e.g., control beam 2) having a better beam link quality is available. Accordingly, the BS 110 can transmit a beam switching command to cause the UE 120 to switch from control beam 1 to control beam 2 for reception of downlink control channels and data channels.

At S205, in response to the beam switching command, the UE 120 can start to monitor control beam 2 to receive PDCCHs. The steps of S201-S205 can be performed repeatedly to maintain at least one control beam with a satisfied quality.

However, the beam switching process 200A may not be performed successfully in some scenarios. For example, at S203, due to a deterioration of the uplink (e.g., blocking or fast channel fading), the measurement report may not be received at the BS 110. At S204, due to a deterioration of the downlink, the beam switching command cannot be received at the UE 120. In a further example, the beam switching command may be received at the UE 120, however, the new candidate control beam 2 may suddenly deteriorate. Thus, in the above scenarios, when beam pair link quality of control beam 1 continues to fall, a beam failure may be detected. For example, based on measurement of a beam pair link quality of control beam 1 against a threshold during a preconfigured time interval, the UE 120 can determine a beam failure instance occurs.

Figure 2B:
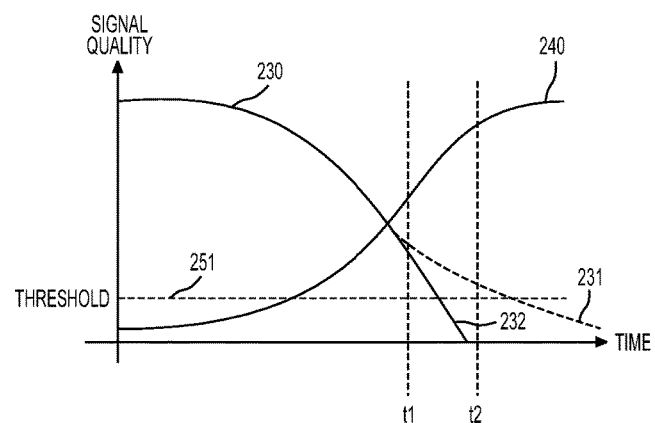

FIG. 2B shows an example of a failed beam switching command transmission during the beam switching process 200A. FIG. 2B shows two curves 230 and 240 representing signal qualities of beam pair links of control beam 1 and control beam 2, respectively. As shown, the quality of control beam 1 (curve 230) is falling, while the quality of control beam 2 (curve 240) is rising, for example, due to moving of the UE 120. FIG. 2B also shows a threshold 251. When a quality of a control beam falls below the threshold 251, data transmitted over the control beam may not be received correctly at the UE 120.

At time instance t1, based on a beam pair link quality measurement results, the BS 110 can determine that the signal quality of control beam 1 is below a threshold, and control beam 2 has a better quality than control beam 1. Accordingly, at time instance t2, the BS 110 can transmit a beam switching command to switch PDCCH transmission from control beam 1 to control beam 2.

Assuming the quality of curve 230 falls slowly following a curve 231, at time instance t2, the quality of control beam 1 is above the threshold 251, and the beam switch command can be properly received at the UE 120. As a result, the UE 120 may successfully switch from control beam 1 to control beam 2. However, if the quality of curve 230 falls quickly (e.g., due to blocking) following a curve 232, at time instance t2, the quality of control beam 1 may fall below the threshold 251, and the beam switch command cannot be correctly received at the UE 120. As a result, the expected beam switching may fail, and subsequently a beam failure instance may be detected based on a beam failure detection standard.

Figure 3:
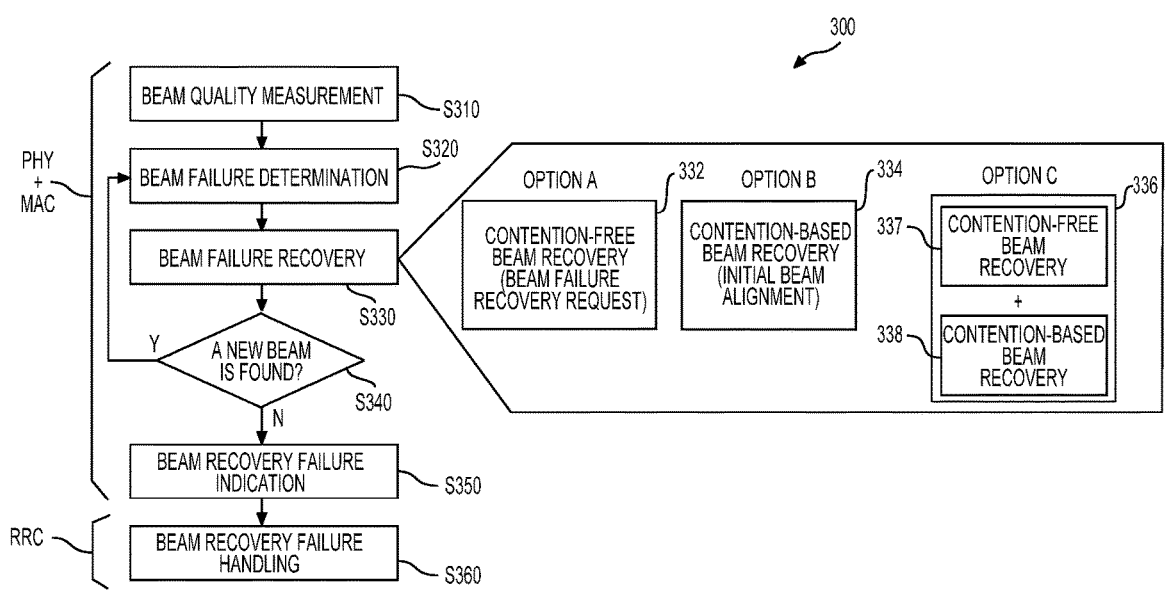
FIG. 3 shows an example beam failure handling process according to some embodiments of the disclosure.

FIG. 3 shows an example beam failure handling process 300 according to some embodiments of the disclosure. The process 300 can include steps S310-S360, and be performed at the UE 120 to handle beam failure situations. In one example, the steps S310-S350 can be performed at a physical (PHY) layer and a medium access control (MAC) layer, and the step S360 can be performed in a radio resource control (RRC) layer in a protocol stack of the UE 120 implementing the 5G NR air interface.

At step S310, beam quality measurement can be performed to measure beam qualities of Tx beams of the BS 110. A beam quality of a Tx beam refers to a quality of a beam pair link formed by the Tx beam of the BS 110 and a respective reception beam of the UE 120. Two set of beams can be measured: a set of control beams and a set of candidate beams.

For example, the UE 120 can be configured to monitor the set of control beams to search for PDCCHs intended for the UE 120. During the beam quality measurement, beam qualities of the set of control beams can be periodically measured at the PHY layer. Measured beam qualities during a periodic interval can be compared with a preconfigured threshold. When a measured beam quality of a control beam is below the threshold, a beam failure instance of the respective control beam can be determined. Accordingly, a beam failure instance indication (beam failure trigger) of the respective control beam can be reported from the PHY layer to the MAC layer. Each beam failure instance indication corresponds to a periodic interval during which a quality of a control beam is measured.

One or multiple measurement metrics can be used for beam quality measurement. For example, the measurement metrics can include failure of reception of one more data blocks, channel state indicator (CSI), channel quality indicator (CQI), measured signal strength or quality (e.g., reference signal received power (RSRP), reference signal received quality (RSRQ)), Qoutindication according to PDCCH BLER same as the radio link monitoring (RLM) model specified in 3GPP standards, and the like. Various beam failure detection RSs can be used for evaluating a quality of a control beam. For example, the synchronization or reference signals, PSS, SSS, and/or CSI-RS, can be used for purpose of control beam quality measurement.

In addition, the UE 120 can be configured to measure the set of candidate beams. For example, when one or more control beams of the UE 120 fail, one or more beams can be selected from the set of candidate beams to replace the failed control beams. The selected beams have a quality above a configurable threshold. Accordingly, beam qualities of the candidate beams can be periodically measured and reported from the PHY layer to the MAC layer or requested from MAC layer. Measurement metrics and RSs used for candidate beam quality measurement can be similar to that used for control beam quality measurement.

At S320, beam failure determination can be performed to declare a beam failure according to a beam failure declaration criterion. For example, the MAC layer receives beam failure instance indications of a control beam from the PHYlayer. When a number of beam failure instance indications of the control beam received during a sequence of consecutive periodic intervals are above a threshold, a beam failure of the respective control beam can be determined. In alternative examples, when a number of beam failure instance indications of the respective control beam received during a preconfigured time are above a threshold, a beam failure of the respective control beam can be determined. In one example, when all of the set of control beams configured for the UE 120 are failed (according to the above beam failure declaration criterions), a beam failure can be declared, which indicates that the downlink quality becomes deteriorated so that the BS 110 cannot reach the UE 120 with a control channel.

At S330, a beam failure recovery process can be performed. For example, when a beam failure is declared, the MAC layer can be triggered to initiate the beam failure recovery process to acquire a new beam for downlink control channel transmission. The beam failure recovery process can have three options A/B/C in various embodiments of the process 300 as shown in FIG. 3.

In option A, a contention-free beam recovery process 332 can be performed to transmit a beam failure recovery request from the UE 120 to the BS 110. The beam failure recovery request can indicate to the BS 110 one or more of new candidate beams for replacing the failed beams, associated with which UE is sending the beam recovery request over the dedicated PRACH resource.

To perform the contention-free beam recovery, the UE 120 can be configured with a set of dedicated physical random access channel (PRACH) preambles, for example, by to a beam recovery configuration received through RRC messages. For different UEs, different dedicated PRACH preambles can be configured for beam recovery purpose. As a result, using a dedicated PRACH preamble, the UE 120 can perform a two-step contention-free random access process to transmit the beam recovery request. The BS 110 can identify the UE sending the recovery request based on the dedicated preamble assigned to the respective UE.

In one example, each of the set of candidate beams measured by the UE 120 is associated with a dedicated PRACH preamble according to the beam recovery configuration. When a candidate beam having a quality above a threshold is selected, a dedicated preamble corresponding to the selected candidate beam can be used to perform the contention-free random access. Based on the transmitted dedicated preamble, the BS 110 can be informed of which candidate beam is to be used as a new control beam replacing a failed control beam. In alternative examples, different PRACH transmission resources may be configured for distinguishing the candidate beams. For example, physical transmission resources at different subcarriers and/or time slots can be configured for different candidate beams.

As an example, the contention-free beam recovery process 332 can be performed in the following way. First, in response to a beam failure declaration, a candidate beam with a best quality above a threshold can be selected among the set of candidate beams based on the measurement results provided by the PHY layer. A dedicated PRACH preamble corresponding to the selected candidate beam can accordingly be determined. Then, a contention-free random access using the dedicated PRACH preamble can be performed. For example, a first message including the dedicated PRACH preamble can first be transmitted from the UE 120 to the BS 110. Based on the received dedicated PRACH carried in the first message, the BS 110 can know which beam is to be used for PDCCH transmission for which UE. Subsequently, the BS 110 can reply a second message to the UE 120 specifying an uplink resource grant on a PDCCH carried over the selected beam. At the UE 120 side, the UE 120 can start to monitor PDCCHs on the selected beam, for example, after a preconfigured time interval. If the second message is successfully received at the UE 120, the contention-free beam recovery is completed.

The contention-free beam recovery process 332 can be tried for one or more times. A counter can be used to define a maximum number of trials. A timer can be used to define an interval for the trials. In various examples, the counter or the timer can be used alone or in combination.

In option B, a contention-based beam recovery process can be performed to obtain a new control beam for replacing the failed control beams. For example, no dedicated PRACH preambles are configured. The UE 120 uses one of a set of PRACH preambles shared among multiple UEs to perform a contention-based random access process to set up a beam pair link. In some examples, this contention-based beam recovery process is similar to a beam alignment process performed during an initial access process when a UE is powered on in order to set up a beam pair link. Thus, the contention-based beam recovery process is referred to as an initial beam alignment process in some examples.

As an example, the contention-based beam recovery process can be performed in the following way. First, a new beam can be determined. For example, one of the set of candidate beams measured by the UE 120 having a quality above a threshold can be selected. If no candidate beam having a quality above the threshold is available, the beams with SSBs are considered and the qualities of beam pairs formed by a BS Tx beam and a UE Rx beam are measured and will be used. A beam with the best quality above a threshold can be selected to be the new beam.

Then, a contention-based random access can be performed to convey to the BS 110 the new beam and the identity of the UE 120 trying to establish a beam pair link. In one example, a set of PRACH preambles each associated with a Tx beam of the BS 110 is configured. Thus, a PRACH preamble corresponding to the new beam can be used to indicate the new beam to the BS 110. In one example, different PRACH transmission resources (e.g., different locations in frequency or time domain) each corresponding to a Tx beam of the BS 110 is configured. Accordingly, the UE 120 can perform the contention-based random access process using one of these PRACH transmission resources for indication of the new beam.

In one example of the random access process, the UE 120 sends a first message to the BS 110 using an existing uplink beam pair link. The BS 110 can accordingly learn the new beam from the PRACH preamble carried in the first message. The BS 110 replies a second message to the UE 120 indicating a timing advance over the new beam. The UE 120 sends a third message along with an identity of the UE 120 to the BS 110 with an adjusted timing. Additionally, a purpose of beam recovery can be conveyed to the BS 110 during transmission of the third message. As a result, the BS 110 can learn which UE is requesting a connection of a beam pair link. The BS 110 can subsequently transmit a fourth message over the new beam informing the UE 120 the contention has been solved. The UE 120 then starts to monitor the new beam for reception of PDCCHs.

Similarly, the contention-based beam recovery process 334 can be tried for one or more times. A counter or a timer can be used alone or in combination to control a number of trials or an interval for the trials.

It is noted that according to different configurations, the contention-based beam recovery process may be performed in different ways in various examples. For example, associations between Tx beams of the BS 110 and the PRACH preambles or PRACH transmission resources may not be configured. Accordingly, additional steps or operations can be performed.

In option C, a process 336 combining a contention-free beam recovery process 337 and a contention-based beam recovery process 338 can be performed to obtain a new control beam in place of failed control beams. The processes 337 and 338 can be similar to the processes 332 and 334, respectively.

In a first example of option C, depending on some conditions, the contention-free process 337 can first be performed one or more times, and then followed by the contention-based process 338 that are performed one or more times. Specifically, after the beam failure declaration, when a candidate control beam having a quality above a threshold is available and dedicated PRACH preambles are configured, the MAC layer can determine to first perform the contention-free process 337. The contention-free process 337 can be tried for one or more times. A counter can be used to define a maximum number of trials. A timer can be used to define the time duration for the trials. In various examples, the counter or the timer can be used alone or in combination.

When a candidate control beam having a quality above a threshold is unavailable, or no dedicated PRACH preambles are configured, or when one or more trial of the process 337 are failed, the contention-based process 338 can be performed. Similarly, the contention-based process 338 can be tried for one or more times. A counter or a timer, alone or in combination, can be used to control a number of trials or the time duration for the trials. If no new control beam is acquired at the end of the contention-based process 338, the process 336 can be terminated.

Alternatively or additionally, a timer and/or a counter can be configured for supervising the whole process 336 in the first example. The timer configured for the whole process 336 can define a time duration for the whole process 336. The counter configured for the whole process 336 can defined a maximum number of repetitions of the processes 337 and 338.

In a second example of option C, the contention-free process 337 and the contention-based process 338 can be performed alternately. For example, the process 337 is performed one or more times during a first step, then the process 338 is performed one or more times during a second step. Subsequently, the process 337 is performed one or more times again during a third step followed by the process 338 that is performed one or more times during a fourth step. A timer and/or a counter can be configured for each of the process 337 or 338 that can be used when the respective process is repeatedly performed during each step. Alternatively or additionally, a timer and/or a counter can be configured for supervising the whole process 336 of the second example. The timer configured for the whole process 336 can define a time duration for the whole process 336. The counter configured for the whole process 336 can defined a maximum number of steps, or a maximum number of repetitions of the processes 337 and 338.

At S340, if a new control beam is successfully acquired, the process 300 can return to the step of S320. Otherwise, the process 300 can proceed to the step of S350. For example, a respective timer expires or a respective counter has reached its maximum value, and no new control beam is obtained. The beam failure recovery process 330 can be determined to be failed, which is equivalent to a failure of one or more contention-free or contention-based random access processes.

At S350, a beam recovery failure indication is transmitted from the MAC layer to the RRC layer in response to the determination at S340.

At S360, beam recovery failure handling can be performed. In one example, the UE 120 may search for other neighboring cells to establish a connection. For example, the neighboring cells can each be associated with a base station implementing 5G NR air interface (similar to the BS 110), or a base station implementing evolved universal terrestrial radio access (E-UTRA) air interface of long term evolution (LTE). In one example, the UE 120 is configured with a list of neighboring cells that can be used as fallback cells. When a beam recovery failure occurs at a serving cell of the UE 120, the UE 120 can select a fallback cell from the list, and perform an initial access process to connect to the fallback cell. In one example, the UE 120 can be configured with a macro cell as a default fall back cell. When a beam recovery failure occurs, the UE can select the preconfigured macro cell to establish a connection. The macro cell can be a cell formed by a BS implementing an eNB node as specified by 3GPP LTE standards. Typically, a macro cell may have a higher transmission power and a larger serving area than a small cell formed by a TRP or BS implementing 3GPP 5G NR standards.

Figure 4:
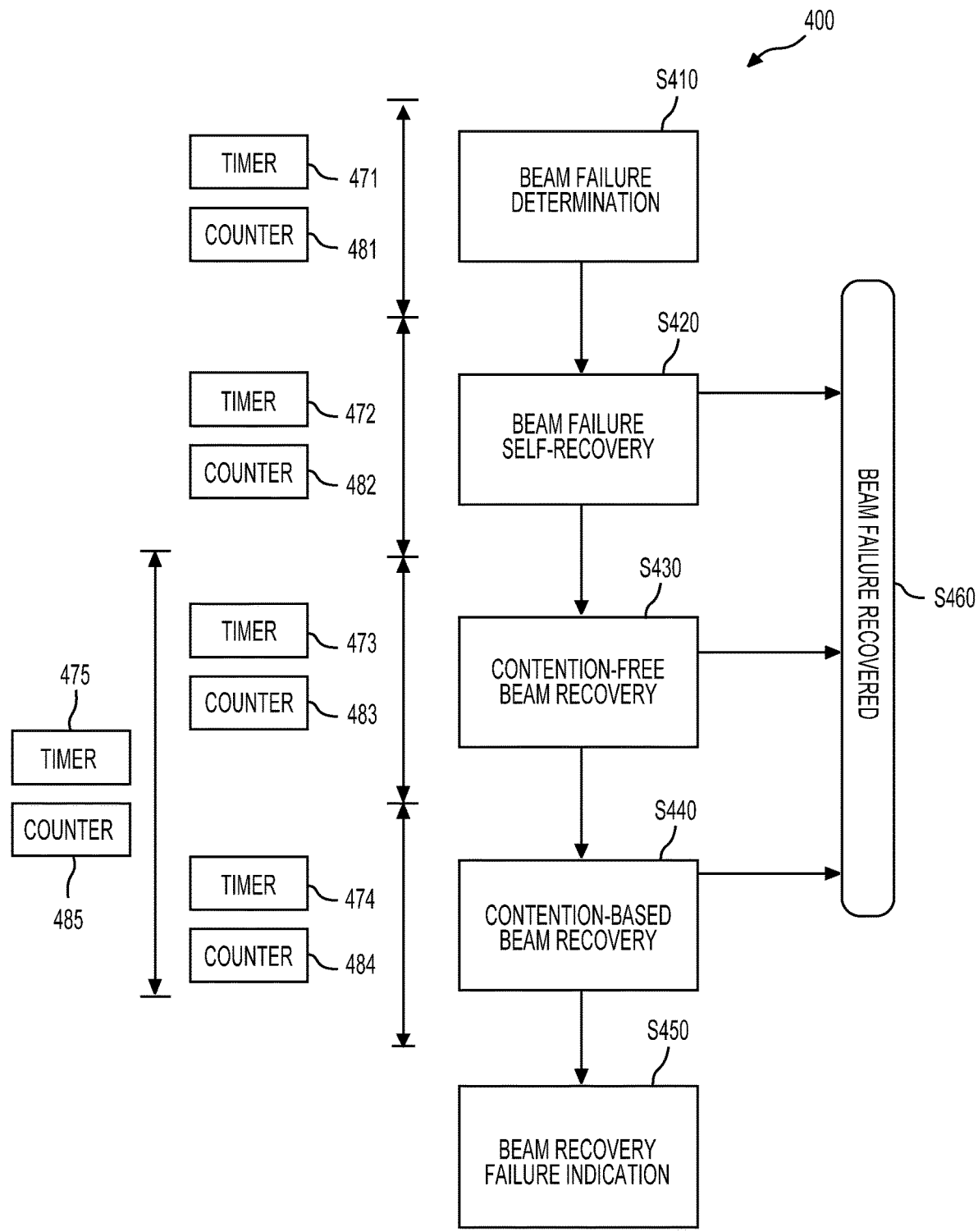
FIG. 4 shows examples of utilizations of timers and counters during a beam failure handling process according to some embodiments of the disclosure.

FIG. 4 shows examples of utilizations of timers and counters during a beam failure handling process 400 according to some embodiments of the disclosure. The process 400 includes steps of S410-S460. The steps S410, S430, S440, and S450 are similar to the steps S320, S337 (S332), S338 (S334), and S350 of the process 300 in FIG. 3, respectively. At S420, a beam failure self-recovery process is performed. When the beam failure is self-recovered at S420, or a new beam is obtained at S430, or S440, the process 400 terminates at S460.

During each of S410-S440, a timer and/or a counter can be employed to supervise the respective processes. Specifically, at S410, during the beam failure determination process, the timer 471 and/or the counter 481 can be used. In one example, when a number of beam failure instance indications received during consecutive reporting intervals from the PHY layer is above a threshold, a beam failure can be determined. Accordingly, the counter 481 can be used to count the number of beam failure instance indications received during consecutive reporting intervals. In one example, when a number of beam failure instance indications received during a time period is above a threshold, a beam failure can be determined. Accordingly, the timer 471 and the counter 481 can be used in combination to supervise the beam failure determination process.

At S420, the beam failure self-recovery process is performed. The timer 472 and the counter 482 can be used to supervise this process. For example, when a beam failure of a control beam is declared at S410, the timer 472 can be triggered to start a beam self-recovery period. The MAC layer can receive beam self-recovery instance indications from the PHY layer. As described above, the PHY layer measures qualities of control beams periodically. In various examples, measurement metrics similar to that used for determining a beam failure instance can be used for determining a beam self-recovery instance. For example, when a quality measurement of the failed control beam obtained during a measurement periodic interval is above a threshold, a beam self-recovery distance indication of this failed control beam can be determined and reported to the MAC layer.

In a first case, when a number of beam self-recovery instance indications received before the timer 472 expires is above a threshold, it can be determined that the failed control beam is self-recovered. In a second case, when a number of beam self-recovery instance indications received during consecutive reporting intervals before the timer 472 expires is above a threshold, the failed control beam can be determined to be recovered. Accordingly, for either of the first and second cases, the counter 482 can be used to count the number of beam self-recovery instance indications to supervise the beam failure self-recovery process in combination with the timer 472.

At S430, the timer 473 can be used to define a time length, and the counter 483 can be used to define a maximum number of trials for repeatedly performing the contention-free beam recovery process. The timer 473 and the counter 483 can be used independently, or in combination. For example, when used in combination, when the timer 473 expires or the counter 483 reaches a maximum value, whichever takes place earlier, repetition of the contention-free beam recovery process can be terminated.

At S440, the timer 474 and/or the counter 484 can be used to supervise the repeatedly-performed contention-based beam recovery process in a way similar to the timer 473 and the counter 483.

In an alternative example, a timer 475 and/or a counter 485 can be defined for a process that includes the steps of S430 and S440. For example, the timer 475 can be used to determine a time length for the two steps S430 and S440. The counter 485 can be used to determine a total number of repetition times of the contention-free beam recovery process and the contention-based beam recovery process.

Please note that the timers/counters in FIG. 4 are for illustration only. According to different design requirements, each timer could be set to zero. In other words, one or more steps in FIG. 4, such as S420, S430 and/or S440, could be omitted. Also, two or more timers could be merged or combined.

Figure 5A:
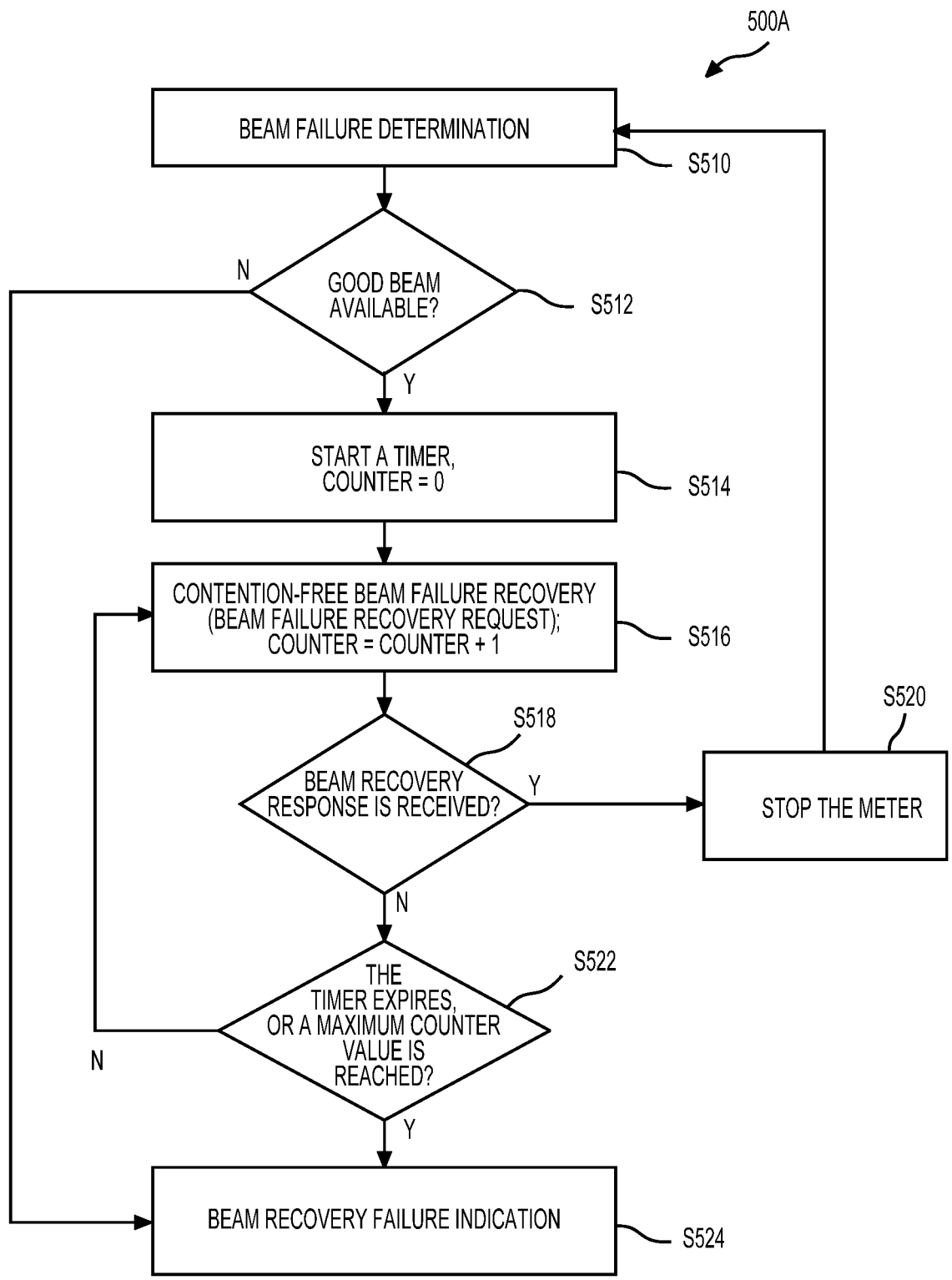
FIGS. 5A-5B show two example beam failure recovery handling processes according to embodiments of the disclosure.

FIG. 5A shows an example beam failure recovery handling process 500A according to an embodiment of the disclosure. A contention-free beam recovery process is performed during the process 500A to handle a beam failure situation.

At S510, a beam failure determination can be performed in a way similar to S320 in FIG. 3. For example, the UE 120 is configured with one or more control beams for receiving PDCCHs. A beam failure can be declared when all control beams are failed.

At S512, whether a good beam (e.g., a candidate beam having a measured quality above a threshold) is available is determined. When the good beam is available, the process 500A proceeds to S514. Otherwise, the process proceeds to S524.

At S514, a timer is started, and a counter is initiated with a value of zero.

At S516, a contention-free beam failure recovery process can be performed such as the contention-free beam recovery process 332 at FIG. 3. Accordingly, a beam failure recovery request can be transmitted from the UE 120 to the BS 110 by performing a contention-free random access process using a dedicated PRACH preamble associated with the good beam. In addition, the counter value is increased by 1.

At S518, when a beam recovery response from the BS 110 is received on the good beam at the UE 120, the process 500A proceeds to S520. Otherwise, the process 500A proceeds to S522.

At S520, the timer is stopped. The process 500A returns to S510 subsequently.

At S522, whether the timer expires or the counter has reached a maximum counter value is checked. When the timer expires, or the counter reaches the maximum counter value, the process 500A proceeds to S524. Otherwise, the process 500A returns to S516.

At S524, a beam recovery failure indication is provided from the MAC layer to the RRC layer, which indicates a failure of one or more random access processes performed with contention-free PRACH resources at S516. The process 500A can terminate subsequently.

Figure 5B:
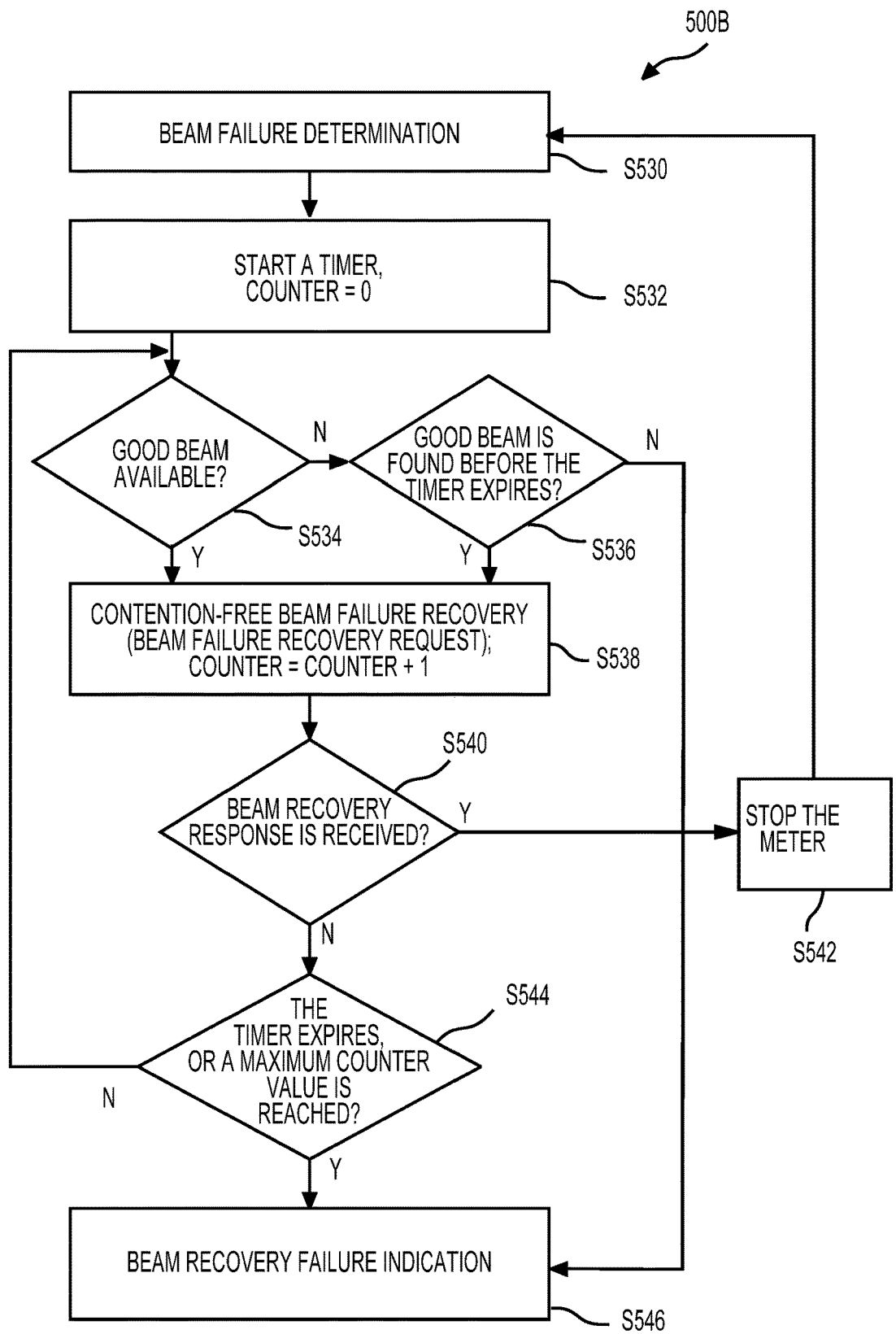

FIG. 5B shows an example beam failure recovery handling process 500B according to an embodiment of the disclosure. A contention-free beam recovery process is performed during the process 500B to handle a beam failure situation.

At S530, a beam failure determination can be performed in a way similar to S320 in FIG. 3. For example, the UE 120 is configured with one or more control beams for receiving PDCCHs. A beam failure can be declared when all control beams are failed.

At S532, a timer is started, and a counter is initiated with a value of zero.

At S534, whether a good beam (a candidate beam having a measured quality above a threshold) is available is determined. When the good beam is available, the process 500B proceeds to S538. Otherwise, the process 500B proceeds to S536. At S536, the UE 120 continually searches for a good beam while monitoring whether the timer expires. In one example, the UE 120 continually measures qualities of the set of candidate beams to monitor if a good beam is available. For example, a channel condition may vary, and qualities of the candidate beams may accordingly vary. When a good beam is found before the timer expires, the process 500B proceeds to S538. Otherwise, the process 500B proceeds to S546.

At S538, a contention-free beam failure recovery process can be performed such as the contention-free beam recovery process 332 at FIG. 3. Accordingly, a beam failure recovery request can be transmitted from the UE 120 to the BS 110 by performing a contention-free random access process using a dedicated PRACH preamble associated with the good beam. In addition, the counter value is increased by 1.

At S540, when a beam recovery response from the BS 110 is received on the good beam at the UE 120, the process 500B proceeds to S542. Otherwise, the process 500B proceeds to S544.

At S542, the timer is stopped. The process 500B returns to S530 subsequently.

At S544, whether the timer expires or the counter has reached a maximum counter value is checked. When the timer expires, or the counter reaches the maximum counter value, the process 500B proceeds to S546. Otherwise, the process 500 returns to S534 (checking whether there is good beam).

At S546, a beam recovery failure indication is provided from the MAC layer to the RRC layer, which indicates a failure of one or more random access processes performed with contention-free PRACH resources at S538. The process 500B can terminate subsequently.

Figure 6:
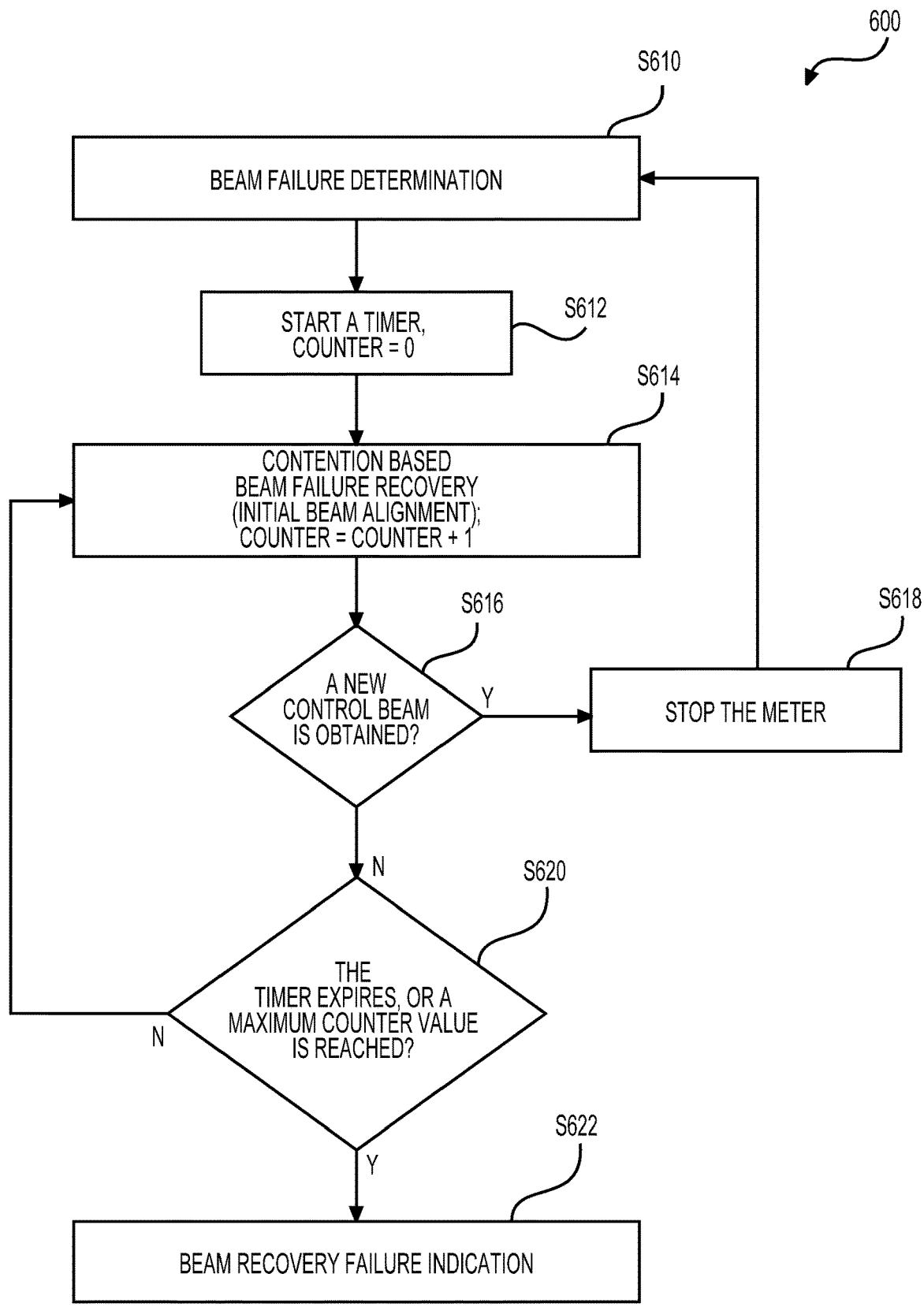
FIG. 6 shows an example beam failure recovery handling process according to an embodiment of the disclosure.

FIG. 6 shows an example beam failure recovery handling process 600 according to an embodiment of the disclosure. A contention-based beam recovery process is performed during the process 600 to handle a beam failure situation.

At S610, a beam failure determination can be performed in a way similar to S320 in FIG. 3. For example, the UE 120 is configured with one or more control beams for receiving PDCCHs. A beam failure can be declared when all control beams are failed.

At S612, a timer is started, and a counter is initiated with a value of zero.

At S614, a contention-based beam failure recovery process can be performed such as the contention-based beam recovery process 334 at FIG. 3. Accordingly, a contention-based random access process can be performed using a shared PRACH preamble that may or may not be associated with a beam having a measured quality above a threshold. In addition, the counter value is increased by 1.

At S616, when a new control beam is obtained as a result of S614, the process 600 proceeds to S618. Otherwise, the process 600 proceeds to S620.

At S618, the timer is stopped. The process 600 returns to S610 subsequently.

At S620, whether the timer expires or the counter has reached a maximum counter value is checked. When the timer expires, or the counter reaches the maximum counter value, the process 600 proceeds to S622. Otherwise, the process 600 returns to S614.

At S622, a beam recovery failure indication is provided from the MAC layer to the RRC layer, which indicates a failure of one or more random access processes performed with contention-based PRACH resources at S614. The process 600 can terminate subsequently.

Figure 7:
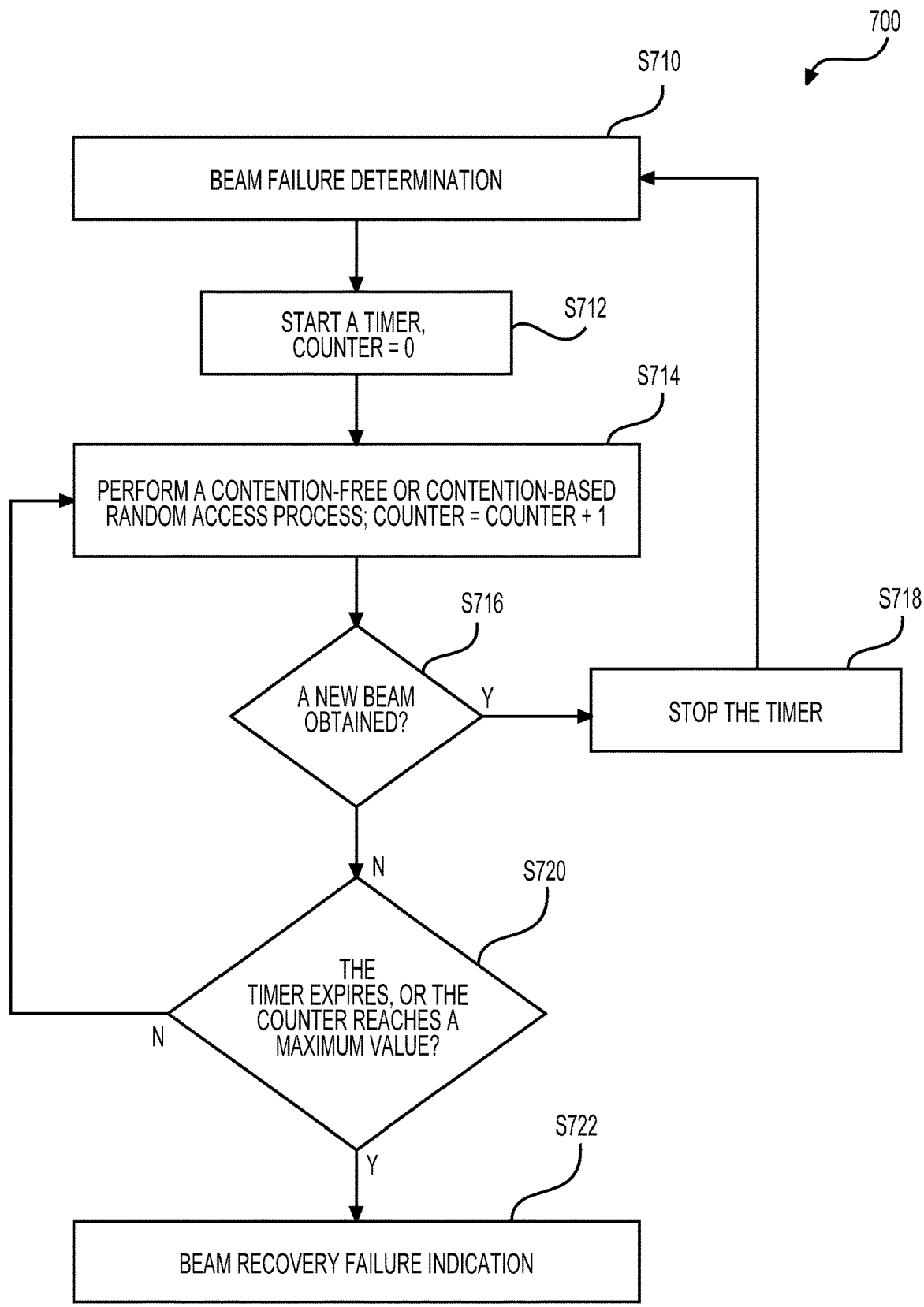
FIG. 7 shows an example beam failure recovery handling process according to an embodiment of the disclosure.

FIG. 7 shows an example beam failure recovery handling process 700 according to an embodiment of the disclosure. A contention-free beam recovery process and a contention-based beam recovery process are performed alternately during the process 700 to handle a beam failure situation.

At S710, a beam failure determination can be performed in a way similar to S320 in FIG. 3. For example, the UE 120 is configured with one or more control beams for receiving PDCCHs. A beam failure can be declared when all control beams are failed.

At S712, a timer is started, and a counter is initiated with a value of zero.

At S714, assuming a good beam is available and dedicated PRACH preambles are configured, a contention-free beam recovery process similar to the process 332 can first be performed first. Then, when the S714 is repeated next time, a contention-based beam recovery process similar to the process 334 can be performed. In this way, the contention-free and contention based processes can be performed alternately when S714 is repeatedly performed. As described, a contention-free random access is performed during the contention-free beam recovery process, and a contention-based random access is performed during the contention-based beam recovery process. Accordingly, a contention-free random access process or a contention-based random access will be performed alternately when S714 is repeated. In addition, the counter value is increased by 1.

At S716, when a new control beam is obtained as a result of S714, the process 700 proceeds to S718. Otherwise, the process 700 proceeds to S720.

At S718, the timer is stopped. The process 700 returns to S710 subsequently.

At S720, whether the timer expires or the counter has reached a maximum counter value is checked. When the timer expires, or the counter reaches the maximum counter value, the process 700 proceeds to S722. Otherwise, the process 700 returns to S714.

At S722, a beam recovery failure indication is provided from the MAC layer to the RRC layer, which indicates a failure of one or more random access processes performed at S714. The process 700 can terminate subsequently.

Figure 8A:
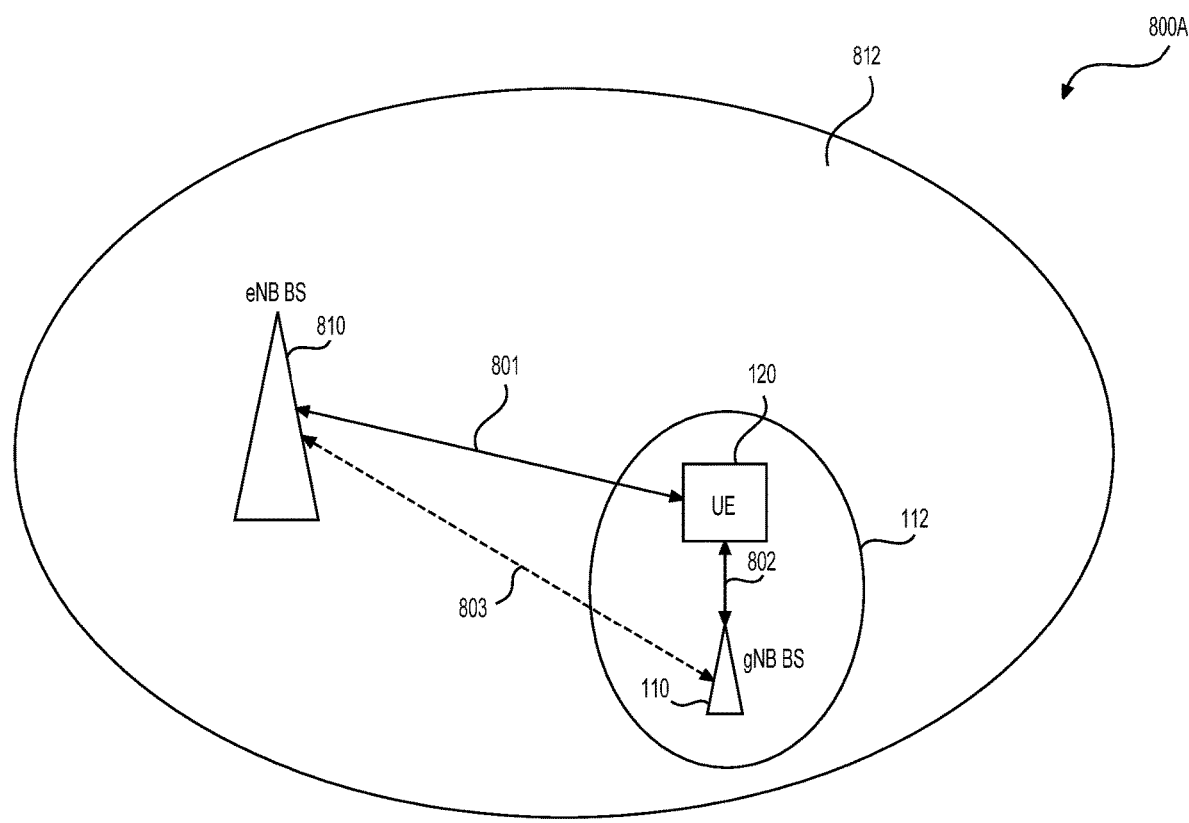
FIGS. 8A-8B show an example of user equipment (UE) configured with multi-cite connectivity or dual connectivity.
Figure 8B:
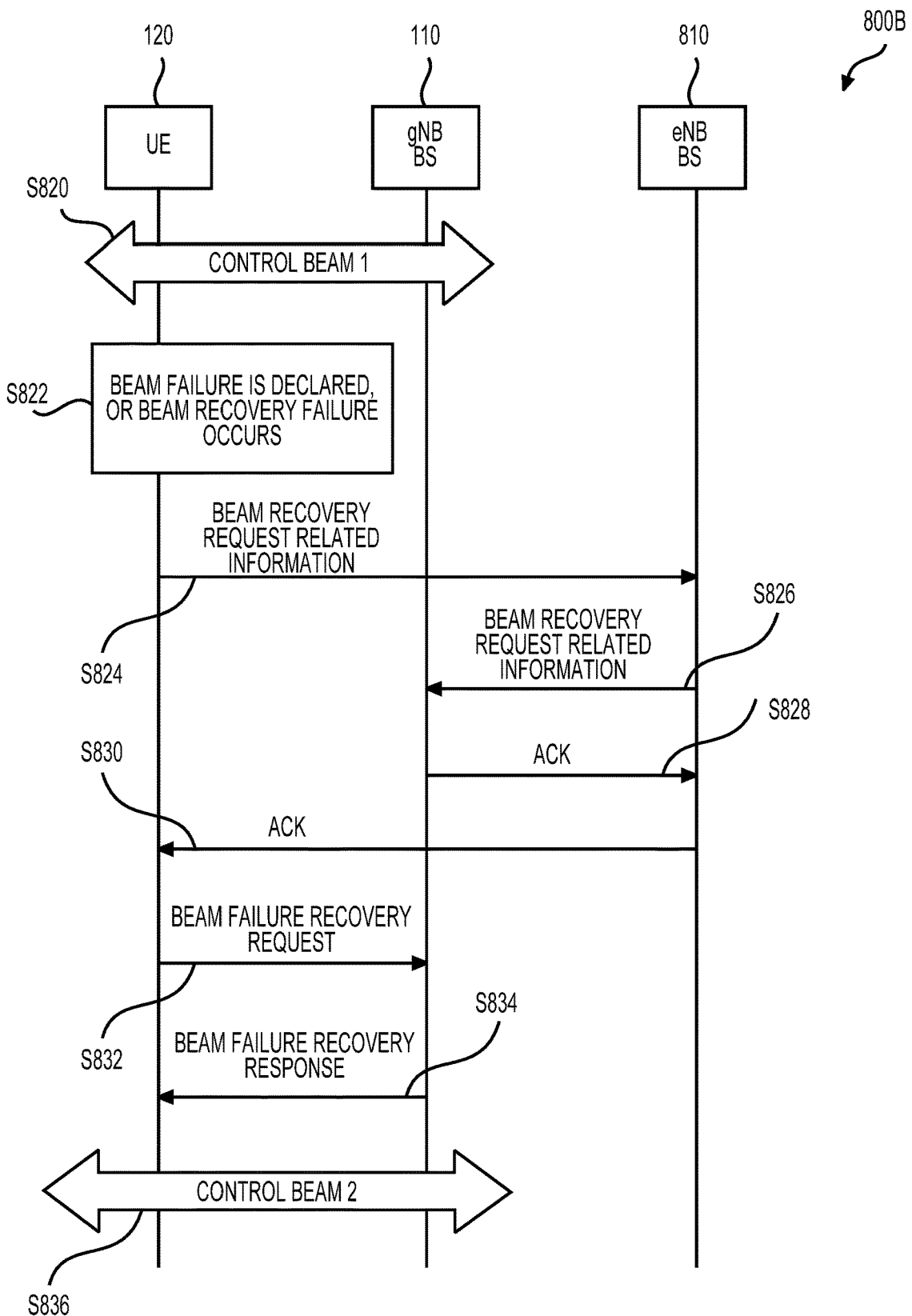

FIGS. 8A-8B show an example of the UE 120 configured with multi-site connectivity or dual connectivity. When a beam failure is declared, the UE 120 can perform a macro-cell-assisted beam failure recovery process. FIG. 8A shows an example wireless communication system 800A performing dual connectivity operations according to an embodiment of the disclosure. FIG. 8B shows an example macro-cell-assisted beam failure recovery process 800B according to an embodiment of the disclosure.

In FIG. 8A example, a macro cell 812 is overlaid with the small cell 112. The macro cell 812 can be formed by an eNB BS 810 implementing an eNB node as specified in 3GPP LTE standards, while the small cell 112 can be formed by the gNB BS 110 implementing a gNB node as specified in 3GPP NR standards. Accordingly, the macro cell 812 and the small cell 112 use different radio access technology (RAT). The macro cell 812 may have a larger serving area than the small cell 112, and have a higher transmission power than the small cell 112.

The UE 120, in coordination with the macro cell 812 and the small cell 112, performs dual connectivity (or multi-cite connectivity) operations. Under the dual connectivity configuration, the UE 120 is simultaneously connected to the two cells 812 and 112. In one example, the eNB BS 810 and the gNB 110 can perform scheduling independently, and be interconnected with each other through a connection 803. The UE 120 can maintain two connections 801 and 802 with the two BSs 810 and 110 simultaneously, and transmit to or receive from the BSs 810 and 110 simultaneously.

In FIG. 8B, the process 800B is performed by the UE 120, the gNB BS 110, and the eNB BS 810 that are in dual-connectivity operations. At S820, the UE 120 monitors a first control beam (control beam 1) of the gNB BS 110 to receive downlink control information (e.g., PDCCH).

At S822, a beam failure is declared, and the process 800B can proceed to S824 to perform a macro-cell-assisted beam failure recovery. Alternatively, in some examples, after a beam failure is declared, contention free and/or contention-based beam recovery processes can first be performed as described above. When no control beam is obtained, and a beam recovery failure occurs, the process 800B can proceed to S824.

At S824, beam recovery request related information can be transmitted from the UE 120 to the eNB BS 810. For example, the beam recovery request related information can be an RRC message specifying when and which control beam of the gNB BS 110 will be used for transmission of a beam failure recovery request. In one example, the beam recovery request related information includes the failure type, including RA failure and beam recovery failure, the beam index and the measurement results of the different beams.

At S826, the beam recovery request related information can be forwarded to the gNB BS 110. At S828, the gNB BS 110 may respond to the eNB BS 810 with an acknowledge message (ACK). At S830, the eNB BS 810 may transmit an ACK to the UE 120 indicating the beam recovery request related information has been received at the gNB BS 110.

At S832, a beam failure recovery request is transmitted from the UE 120 to the gNB BS 110 according to the timing and control beam specified in the beam recovery request related information. The beam failure recovery request can specify a control beam (control beam 2) selected from a set of downlink Tx beams based on quality measurement results. In one example, the beam failure recovery request is transmitted via PUSCH (e.g., MAC CE), or PUCCH (e.g., RRC message). In an alternative embodiment, the beam failure recovery can be included in the beam recovery request related information transmitted at S824. The step of S832 can accordingly be omitted.

At S834, a beam failure recovery response is transmitted from the gNB BS 110 to the UE 120. For example, the response can be DCI carried in a PDCCH intended for the UE 120, or a control element (CE) carried in a transport block carried in a PDCCH. The UE 120 can monitor control beam 2 specified in the beam failure recovery request. When the above DCI or CE is detected over control beam 2, the UE 120 can determine that control beam 2 can be used as a serving beam for receiving downlink control information (e.g., PDCCH).

At S836, the UE 120 can monitor control beam 2 to receive downlink control information. The process 800B can terminate at S836.

Figure 9:
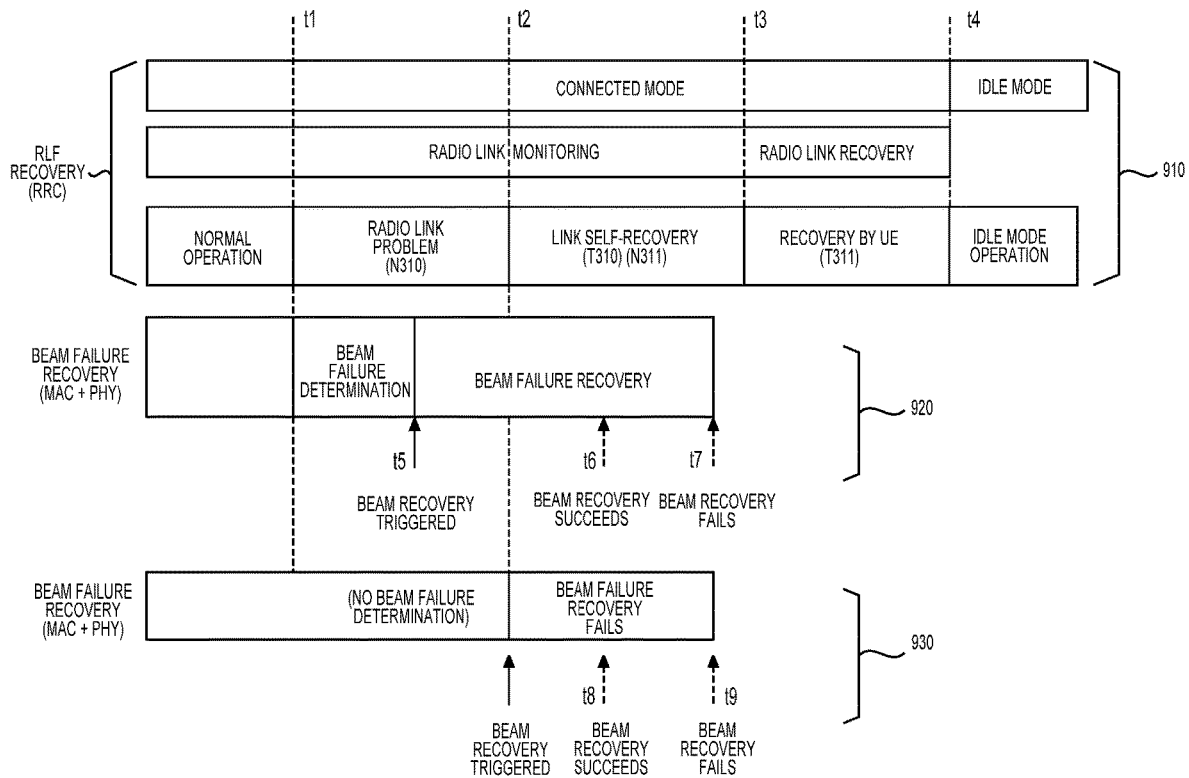
FIG. 9 shows two examples of beam failure recovery processes interacting with a radio link failure (RLF) recovery process according to some embodiments of the disclosure.

FIG. 9 shows two examples of beam failure recovery processes interacting with a radio link failure (RLF) recovery process according to some embodiments of the disclosure. FIG. 9 shows an example RLF recovery process 910 performed at the RRC layer of the UE 120. In the process 910, radio link monitoring (RLM) and RLF recovery functions similar to that specified in 3GPP LTE standards can be performed. In addition, parameters (e.g., N310, T310, N311, T311, Qin, and Qout) similar to that defined in the 3GPP LTE standards can be used.

In the process 910, before t1, the UE 120 is in normal operation. The PHY layer of the UE can continuously measures a downlink quality of a beam pair link serving the UE 120, for example, based on signal-to-noise ratio (SNR) of a cell-specific reference signal (e.g., CSI-RS). For example, the monitored beam pair link can be a beam pair link formed by a control beam from which the UE 120 receives PDCCHs. The PHY layer can compare measure link quality to the thresholds Qout and Qin. For example, when the downlink quality measured during a previous measurement period (e.g., 200 ms) becomes worse than the threshold Qout, the PHY layer sends an out-of-sync indication to higher layers (e.g., RRC layer). When the downlink quality measured during a previous measurement period (e.g., 100 ms) becomes better than the threshold Qin, the PHY layer can send an in-sync indication to the higher layers.

At t1, a radio link problem occurs. The PHY layer may send a sequence of out-of-sync indications to the RRC layer. A counter can be triggered to count the out-of-sync indications received consecutively. At t2, when N310 number of consecutive out-of-sync indications is received, a link failure may be declared. Accordingly, the radio link self-recovery timer T310 can be started. Before the timer T310 expires at t3, if N311 number of in-syc indications is received from the PHY layer, the radio link can be determined to be self-recovered, and the timer T310 can be stopped. If the timer T310 expires at t3, the UE 120 enters the radio link recovery phase from the radio link monitoring phase. The timer T311 can be started. The UE 120 can search for a new cell from neighboring cells to establish a connection. If no connection is established at t4, the timer T311 expires, and the UE 120 transfers from connected mode to idle mode starting the idle mode operation.

FIG. 9 shows a first beam failure recovery process 920. During the process 920, the beam failure determination is performed by the MAC layer, and is independent from the RLM and RLF recovery process 910. However, a beam failure recovery result is reported to the RRC layer, and the radio link self-recovery between t2 and t3 can be terminated based on the beam failure recovery result.

For example, before t5, corresponding to the radio link problem between t1 and t2, beam failure determination is performed, and a beam failure can be declared at t5. Accordingly, a beam failure recovery process can be triggered at t5. At t6, assuming a new beam is obtained, the beam failure recovery can be terminated. At the same time, a beam failure recovery success indication can be provided to the RRC layer. Accordingly, the RLF recovery process 910 can be terminated in response to reception of the beam failure recovery success indication. For example, the radio link self-recovery timer T310 can be stopped. Alternatively, at t7, assuming no new beam is obtained, a beam recovery failure indication can be provided to the RRC layer. Accordingly, the radio link self-recovery between t2 and t3 can be terminated, and the radio link recovery between t3 and t4 can be started. For example, the radio link self-recovery timer T310 can be forced to expire, and the timer T311 can be started.

FIG. 9 shows a second beam failure recovery process 930. During the process 930, no beam failure determination is performed by the UE 120, and the beam failure recovery is triggered by the RRC layer at t2 when the RLF is declared. However, during the beam recovery after t2, a beam recovery result may be reported from the MAC layer to the RRC layer similar to what is performed in the process 920. For example, at t8 or t9, beam failure recovery may succeed or fail, respectively. Accordingly, a beam recovery success or failure indication can be provided to the PHY layer to alter the radio link self-recovery operation.

Figure 10:
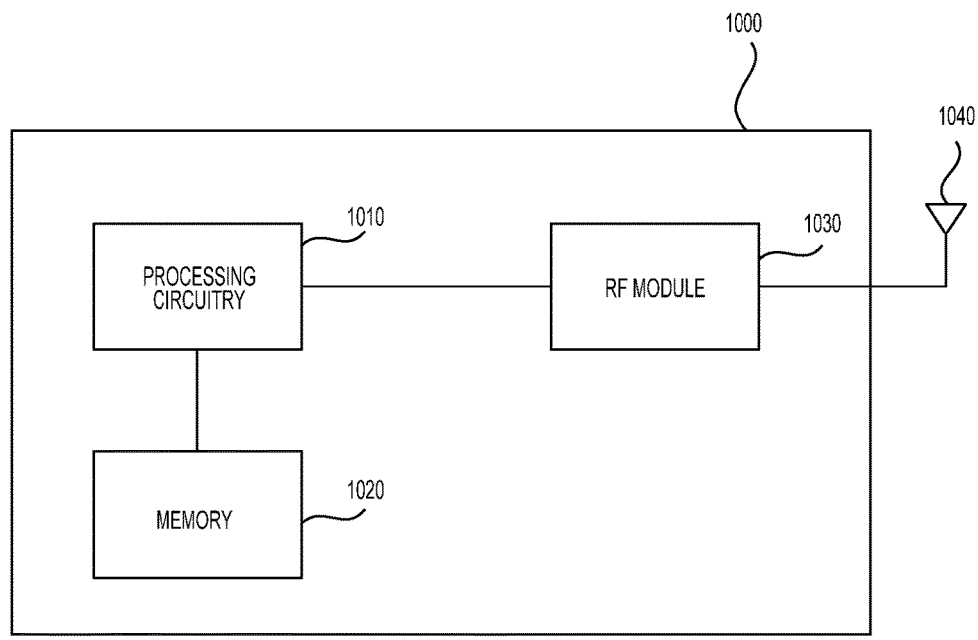
FIG. 10 shows an example UE according to embodiments of the disclosure.

FIG. 10 shows an example UE 1000 according to embodiments of the disclosure. The UE 1000 can be used for implementation of various embodiments of the disclosure. In different examples, the UE 1000 can be a mobile phone, a tablet computer, a desktop computer, a vehicle carried device, and the like. The UE 1000 is capable of communicating with a wireless communication network, such as a 4G LTE network, a 5G NR network, or a combination thereof, as described in the above examples. The UE 1000 can include processing circuitry 1010, a memory 1020, and a radio frequency (RF) module 1030.

In one example, the processing circuitry 1010 can be configured to perform functions of the UE 1000 in various embodiments by execution of program instructions stored in the memory 1020. For example, the functions and processes for the beam failure recovery or the RLF recovery described herein can be performed by the processing circuitry 1010. The memory 1020 can store program instructions that cause the processing circuitry to perform functions of the UE 1000. The memory 1020 can include transitory or non-transitory storage mediums, such as read only memory (ROM), random access memory (RAM), flash memory, a hard disk drive, and the like.

The processing circuitry 1010 can be further configured to perform functions or processes of a PHY layer in various embodiments described herein with or without execution of program instructions stored in the memory 1020. The functions or processes of the PHY layer can include beam link quality measurement, measurement results reporting, L1/L2 control channel or data channel decoding, beamforming, and the like, as described herein. In addition, the functions can include coding, modulation, and the like.

The RF module 1030 receives processed data signal from the processing circuitry 1010 and transmits the signal to a BS in a wireless communication network via an antenna 1040, or vice versa. The RF module 1040 can include various circuitries, such as a digital to analog convertor (DAC), an analog to digital converter (ADC), a frequency up convertor, a frequency down converter, filters, and amplifiers for reception and transmission operations.

The UE 1000 can optionally include other components, such as input and output devices, additional or signal processing circuitry, and the like. Accordingly, the UE 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
   performing, by processing circuitry, beam quality measurement of one or more first beams and one or more second beams in a serving cell transmitted from a base station (BS) at a user equipment (UE) in a beamformed wireless communication system, the one or more first beams used for transmitting physical downlink control channels (PDCCHs), the one or more second beams used as one or more candidate beams for beam failure recovery;
   determining, by the processing circuitry, a beam failure for the one or more first beams in the serving cell occurs based on the beam quality measurement of the one or more first beams; and performing, by the processing circuitry, a beam recovery process that includes at least one of a contention-free beam recovery process or a contention-based beam recovery process, wherein in response to that the beam failure for the one or more first beams in the serving cell occurs where the UE cannot detect the PDCCHs, a candidate beam having a quality above a threshold is available among the one or more candidate beams in the serving cell, and dedicated physical random access channel (PRACH) preambles are configured for the one or more candidate beams in the serving cell at the UE, performing the contention-free beam recovery process with the dedicated PRACH preambles, and in response to that the beam failure for the one or more first beams in the serving cell occurs and a candidate beam having a quality above the threshold is unavailable among the one or more candidate beams in the serving cell, performing the contention-based beam recovery process based on a selected beam in the serving cell other than the one or more first beams and the one or more candidate beams in the serving cell, the selected beam corresponding to a synchronization signal block (SSB) or a channel-state information reference signal (CSI-RS) transmitted in the serving cell from the BS.

2. The method of claim 1, wherein the performing the contention-free beam recovery process with the dedicated PRACH preambles comprises:

transmitting one of the dedicated PRACH preambles based on the candidate beam having the quality above the threshold among the one or more candidate beams in the serving cell.

3. The method of claim 1, wherein the performing the beam recovery process that includes at least one of the contention-free beam recovery process or the contention-based beam recovery process comprises:

performing the contention-free and contention-based processes alternately, wherein one of the contention-free and contention-based processes are performed one or more times before performing another one of the contention-free and contention-based processes one or more times.

4. The method of claim 1, wherein the performing the beam recovery process that includes at least one of the contention-free beam recovery process or the contention-based beam recovery process comprises one of:

performing the contention-free beam recovery process one or more times until a timer expires, performing the contention-free beam recovery process one or more times until a counter reaches a maximum counter value, performing the contention-free beam recovery process one or more times until a timer expires or a counter reaches a maximum counter value, performing the contention-based beam recovery process one or more times until a timer expires, performing the contention-based beam recovery process one or more times until a counter reaches a maximum counter value, or performing the contention-based beam recovery process one or more times until a timer expires or a counter reaches a maximum counter value.

5. The method of claim 1, wherein the performing the beam recovery process that includes at least one of the contention-free beam recovery process or the contention-based beam recovery process comprises one of:

performing the beam recovery process that includes at least one of the contention-free beam recovery process or the contention-based beam recovery process until a timer expires, performing the beam recovery process that includes at least one of the contention-free beam recovery process or the contention-based beam recovery process until a counter reaches a maximum counter value, or performing the beam recovery process that includes at least one of the contention-free beam recovery process or the contention-based beam recovery process until a timer expires or a counter reaches a maximum counter value.

6. The method of claim 1, further comprising:

providing a beam recovery failure indication when the beam recovery process that includes at least one of the contention-free beam recovery process or the contention-based beam recovery process fails; and in response to the beam recovery failure indication, establishing a connection to a preconfigured macro cell.

7. The method of claim 1, further comprising:

performing a macro-cell-assisted beam recovery process before or after performing the beam recovery process that includes at least one of a contention-free beam recovery process or a contention-based beam recovery process.

8. The method of claim 1, further comprising:

providing a beam recovery success indication when the beam recovery process that includes at least one of the contention-free beam recovery process or the contention-based beam recovery process succeeds; and in response to the beam recovery success indication, terminating a radio link failure (RLF) recovery process.

9. The method of claim 1, further comprising:

providing a beam recovery failure indication when the beam recovery process that includes at least one of the contention-free beam recovery process or the contention-based beam recovery process fails; and in response to the beam recovery failure indication, declaring a radio link failure before a RLF self-recovery timer expires.

10. A user equipment (UE), comprising circuitry configured to:

perform beam quality measurement of one or more first beams and one or more second beams in a serving cell transmitted from a base station (BS) in a beamformed wireless communication system, the one or more first beams used for transmitting physical downlink control channels (PDCCHs), the one or more second beams used as one or more candidate beams for beam failure recovery;

determine a beam failure for the one or more first beams in the serving cell occurs based on the beam quality measurement of the one or more first beams; and perform a beam recovery process that includes at least one of a contention-free beam recovery process or a contention-based beam recovery process, wherein in response to that the beam failure for the one or more first beams in the serving cell occurs where the UE cannot detect the PDCCHs, a candidate beam having a quality above a threshold is available among the one or more candidate beams in the serving cell, and dedicated physical random access channel (PRACH) preambles are configured for the one or more candidate beams in the serving cell at the UE, performing the contention-free beam recovery process with the dedicated PRACH preambles, and in response to that the beam failure for the one or more first beams in the serving cell occurs and a candidate beam having a quality above the threshold is unavailable among the one or more candidate beams in the serving cell, performing the contention-based beam recovery process based on a selected beam in the serving cell other than the one or more first beams and the one or more candidate beams in the serving cell, the selected beam corresponding to a synchronization signal block (SSB) or a channel-state information reference signal (CSI-RS) transmitted in the serving cell from the BS.

11. The UE of claim 10, wherein the circuitry is further configured to:
transmit one of the dedicated PRACH preambles based on the candidate beam having the quality above the threshold among the one or more candidate beams in the serving cell.

12. The UE of claim 10, wherein the circuitry is further configured to:
perform the contention-free and contention-based processes alternately, wherein one of the contention-free and contention-based processes are performed one or more times before performing another one of the contention-free and contention-based processes one or more times.

13. The UE of claim 10, wherein the circuitry is further configured to perform one of:
performing the contention-free beam recovery process one or more times until a timer expires,
performing the contention-free beam recovery process one or more times until a counter reaches a maximum counter value,
performing the contention-free beam recovery process one or more times until a timer expires or a counter reaches a maximum counter value,
performing the contention-based beam recovery process one or more times until a timer expires,
performing the contention-based beam recovery process one or more times until a counter reaches a maximum counter value, or
performing the contention-based beam recovery process one or more times until a timer expires or a counter reaches a maximum counter value.

14. A non-transitory computer-readable medium storing program instructions that, when executed by a processor, cause the processor to:
perform beam quality measurement of one or more first beams and one or more second beams in a serving cell transmitted from a base station (BS) in a beamformed wireless communication system, the one or more first beams used for transmitting physical downlink control channels (PDCCHs), the one or more second beams used as one or more candidate beams for beam failure recovery;
determine a beam failure for the one or more first beams in the serving cell occurs based on the beam quality measurement of the one or more first beams; and
perform a beam recovery process that includes at least one of a contention-free beam recovery process or a contention-based beam recovery process, wherein
in response to that the beam failure for the one or more first beams in the serving cell occurs where the UE cannot detect the PDCCHs, a candidate beam having a quality above a threshold is available among the one or more candidate beams in the serving cell, and dedicated physical random access channel (PRACH) preambles are configured for the one or more candidate beams in the serving cell at the UE, performing the contention-free beam recovery process with the dedicated PRACH preambles, and
in response to that the beam failure for the one or more first beams in the serving cell occurs and a candidate beam having a quality above the threshold is unavailable among the one or more candidate beams in the serving cell, perfoiining the contention-based beam recovery process based on a selected beam in the serving cell other than the one or more first beams and the one or more candidate beams in the serving cell, the selected beam corresponding to a synchronization signal block (SSB) or a channel-state information reference signal (CSI-RS) transmitted in the serving cell from the BS.

* * * * *